Feb. 3, 1953     J. S. HICKEY, JR     2,627,110
METHOD OF BONDING NICKEL STRUCTURES
Filed April 12, 1949

Inventor:
John S. Hickey, Jr.,
by Morton D Morse
His Attorney.

Patented Feb. 3, 1953

2,627,110

UNITED STATES PATENT OFFICE 2,627,110

METHOD OF BONDING NICKEL STRUCTURES

John S. Hickey, Jr., Scotia, N. Y., assignor to General Electric Company, a corporation of New York Application April 12, 1949, Serial No. 87,054

3 Claims. (Cl. 29—368)

My invention relates to a method of bonding nickel structures.

In bonding nickel structures, a method of producing a bond which will provide good thermal contact and withstand high temperatures is often desirable. In large electron discharge devices, for example, the cathodes are often fabricated from several sheet nickel parts. Spot welding as commonly employed does not provide heat transfer between the cathode parts which is adequate to prevent the internally located parts from melting. On the other hand, copper brazing, which is commonly employed for bonding nickel parts, provides good thermal contact, but the bond may open up at high temperatures often encountered in operation of the cathode. Since temperatures up to 1200° C. are often employed to prepare the cathode coating for proper emission, a bond between the cathode parts which can withstand this temperature is necessary.

It is an object of this invention to provide a method of bonding nickel parts in which the bond furnishes good thermal contact and is capable of withstanding high temperatures.

According to my invention, I provide a sheet or wire of molybdenum between the surfaces of the nickel parts to be bonded and heat the assembly to a temperature between the temperature of the nickel-molybdenum eutectic and the melting point of nickel. The adjoining molybdenum and nickel surfaces form an alloy ranging in composition from that of the nickel-molybdenum eutectic to one of almost pure nickel, which alloy is mechanically stronger than a copper brazed joint and will withstand temperatures up to that at which it was formed. In addition to providing a good thermal contact, the bond formed by this method is also highly resistant to corrosion.

The features which I desire to protect herein are pointed out with particularity in the appended claims. The invention itself, together with further objects and advantages thereof, may best be understood by reference to the following description taken in connection with the drawings in which Fig. 1 illustrates two sheet nickel cathode parts prepared for bonding and Fig. 2 is an enlarged detail view illustrating a completed bond.

Figure 1:
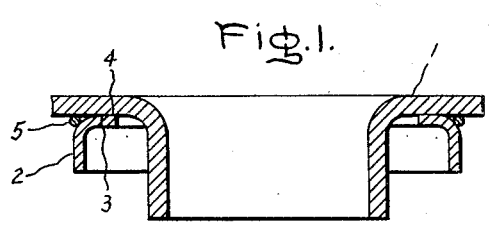

Referring now to Fig. 1, two sheet nickel cathode parts 1 and 2 are shown with their adjoining annular surfaces 3 and 4 in position to be brazed together. Preparatory to brazing, parts 1 and 2 are lightly tack welded together at a few points, although a ceramic jig or other suitable holding means may be employed. A molybdenum wire 5 is placed adjacent the outer junction of the annular surfaces 3 and 4 to provide a source of molybdenum for the bond. The wire 5 may be simply and effectively held in place by encircling the junction with the wire, twisting the ends together tightly with a half turn, and clipping the ends of the wire close to the twisted connection to prevent an excess of molybdenum at that point. While the molybdenum alloying metal is preferably applied as a wire in preparing the junction for brazing, it is obvious that a molybdenum sheet or a number of molybdenum shims may be employed between the nickel surfaces without departing from the spirit of my invention.

The assembly is heated in a reducing atmosphere to a temperature between the nickel and molybdenum eutectic temperature (1320° C.) and the melting point of nickel (1455° C.) for a length of time sufficient to allow the nickel-molybdenum alloy to creep entirely through the joint of the nickel parts 1 and 2. At 1320° C. the eutectic alloy consisting of 54 per cent nickel and 46 per cent molybdenum is formed, and at temperatures up to the melting point of nickel a correspondingly greater portion of nickel from the adjoining nickel surfaces is alloyed. The remelting point of the alloy will be the same as the temperature at which it was formed and the furnace temperature is chosen accordingly. I have found that a furnace temperature of 1350° C. is satisfactory for bonding cathode parts, the temperature being slightly over the eutectic temperature to insure a free flow of the eutectic alloy through the joint and still high enough to prevent re-melting at subsequent cathode operating or forming temperatures.

Figure 2:
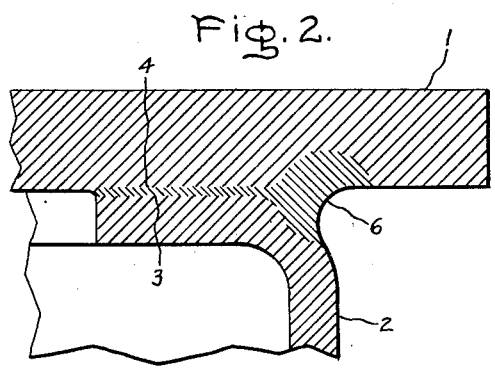

The bond thus formed by the nickel parts 1 and 2 is illustrated in Fig. 2. The eutectic alloy 6 provides a very firm bond and combines with the surface of the nickel parts for the entire width of the joint. The amount of molybdenum employed should not be so large as to permit the alloy to eat a hole through the surface of sheet nickel parts 1 or 2. While the period of time for which the assembly is heated may be controlled to prevent alloying of all of the molybdenum, I prefer to use instead a relatively small amount of molybdenum, all of which is alloyed, the quantity of the alloy then depending upon its consistency as determined by the alloying temperature. This method of brazing nickel parts is, of course, equally applicable to structures other than nickel parts and also useful wherever the joint must be highly resistant to corrosion.

While the present invention has been described by reference to particular embodiments thereof, it will be understood that numerous modifications may be made by those skilled in the art without actually departing from the invention. I, therefore, aim in the appended claims to cover all such equivalent variations as come within the true spirit and scope of the foregoing disclosure.

What I claim as new and desire to secure by Letters Patent of the United States is:

1. A method of bonding nickel structures which comprises placing said structures in juxtaposition with a quantity of molybdenum adjacent the surfaces to be joined, and heating said structures in a reducing atmosphere to a temperature between the eutectic temperature of nickel and molybdenum and the melting point of nickel to form an alloy of the adjoining nickel and molybdenum surfaces.

2. A process for brazing two nickel structures which comprises placing said structures in juxtaposition, positioning a molybdenum wire along the edge of the junction of said surfaces, and heating the assembly in the presence of a reducing gas to a temperature between 1320° C. and 1455° C. to form an alloy of the molybdenum with the adjoining nickel surfaces.

3. A method of brazing two sheet nickel cathode parts which comprises placing the surfaces of said parts in juxtaposition, tack welding said parts together, positioning a molybdenum wire along the edge of the junction of said surfaces, placing the assembly in a furnace supplied with a reducing gas, and heating said assembly to a temperature between the eutectic temperature of nickel and molybdenum and the melting point of nickel to form an alloy of the molybdenum with the adjoining nickel surfaces.

JOHN S. HICKEY, Jr.

REFERENCES CITED

The following references are of record in the file of this patent:

UNITED STATES PATENTS

| Number | Name | Date |
| --- | --- | --- |
| 1,043,576 | Eldred | Nov. 5, 1912 |
| 1,130,077 | Eldred | Mar. 2, 1915 |
| 2,226,944 | Reeve | Dec. 31, 1940 |
| 2,373,117 | Hobrock | Apr. 10, 1945 |
| 2,392,917 | Guinee | Jan. 15, 1946 |
| 2,431,368 | Cherry | Nov. 25, 1947 |

FOREIGN PATENTS

| Number | Country | Date |
| --- | --- | --- |
| 514,882 | Great Britain | Feb. 16, 1938 |
| 487,263 | Great Britain | June 17, 1938 |

OTHER REFERENCES

The Weld. Journal, May 1945, p. 467.